United States Patent [19]

Krug

[11] 4,245,561

[45] Jan. 20, 1981

[54] CONTROLLABLE DISTRIBUTING CONVEYING SYSTEMS

[76] Inventor: Hans J. Krug, 9a Auweg, 8046 Gaiching bei Munich, Fed. Rep. of Germany

[21] Appl. No.: 879,563

[22] Filed: Feb. 21, 1978

[30] Foreign Application Priority Data

Feb. 21, 1977 [DE] Fed. Rep. of Germany ....... 2707379

[51] Int. Cl.$^3$ .......................... B61B 1/00; B61B 13/02
[52] U.S. Cl. ........................................ 104/27; 104/88; 104/96; 104/107; 104/111; 104/130; 104/132; 104/247; 104/298; 105/29 R; 191/2; 238/38; 238/123; 238/134; 403/293; 403/297
[58] Field of Search ....................... 104/18, 20, 27, 28, 104/29–33, 88, 89, 96, 130, 131, 132, 247, 106, 107, 111, 112, 115, 149, 153, 295, 298; 105/29 R, 148; 238/29, 30, 38, 122, 123, 134, 135; 191/2; 403/292, 293, 297

[56] References Cited

U.S. PATENT DOCUMENTS

| | | | |
|---|---|---|---|
| 2,046,661 | 7/1936 | Strauss | 238/123 |
| 2,081,178 | 5/1937 | Kullerstrand | 104/29 X |
| 3,225,704 | 12/1965 | Gilvar et al. | 104/130 X |
| 3,552,321 | 1/1971 | Priebe | 104/18 |
| 3,620,558 | 11/1971 | MacMillan | 403/297 X |
| 3,759,186 | 9/1973 | Sugimoto | 105/29 R X |
| 3,791,306 | 2/1974 | Wagner et al. | 104/130 |
| 3,830,162 | 8/1974 | Marten | 104/130 X |
| 3,922,970 | 12/1975 | Glastra | 104/247 X |
| 3,926,126 | 12/1975 | Voss | 104/96 X |

FOREIGN PATENT DOCUMENTS

| | | | |
|---|---|---|---|
| 2352671 | 5/1974 | Fed. Rep. of Germany | 104/115 |
| 2462233 | 8/1976 | Fed. Rep. of Germany | 104/107 |
| 2262619 | 9/1975 | France | 104/131 |
| 12076 | 4/1977 | Netherlands | 104/96 |

*Primary Examiner*—Randolph A. Reese
*Attorney, Agent, or Firm*—Ladas & Parry

[57] ABSTRACT

A controllable distributing conveying system for transporting people or goods is provided with stations which are arranged on a passive rail network and which include container loading-on positions, container off-loading positions, and container depots. Self-propelled controllable conveying units are movable between the stations and are fitted with pairs of running wheels for normal travel and for travel when being switched in and out and also have container-carrying surfaces separate from the drive section which are coupled by a universal joint member. Containers are loadable onto and off-loaded from the conveying units by means of loading and off-loading arrangements which have active locking members and unlocking members. These containers are held secure in all directions during travel, and are conductable to their destination by the shortest path by means of passive switching-in and switching-out arrangements, and these latter arrangements comprise rails, which the conveying units hold onto.

In operation, at the time when the switching-out operation is to take place, the running wheels of the conveying units, intended for switching-in and-out travel, take hold on the switching-in or switching-out rails on the inside, the normal spacing of these rails being altered to the different spacing of the switching-out arrangement by curving the rails to this altered spacing, as a result of which the switching-in or switching-out wheels are forced to engage with switching-in and switching-out rails running parallel to the main rails.

8 Claims, 41 Drawing Figures

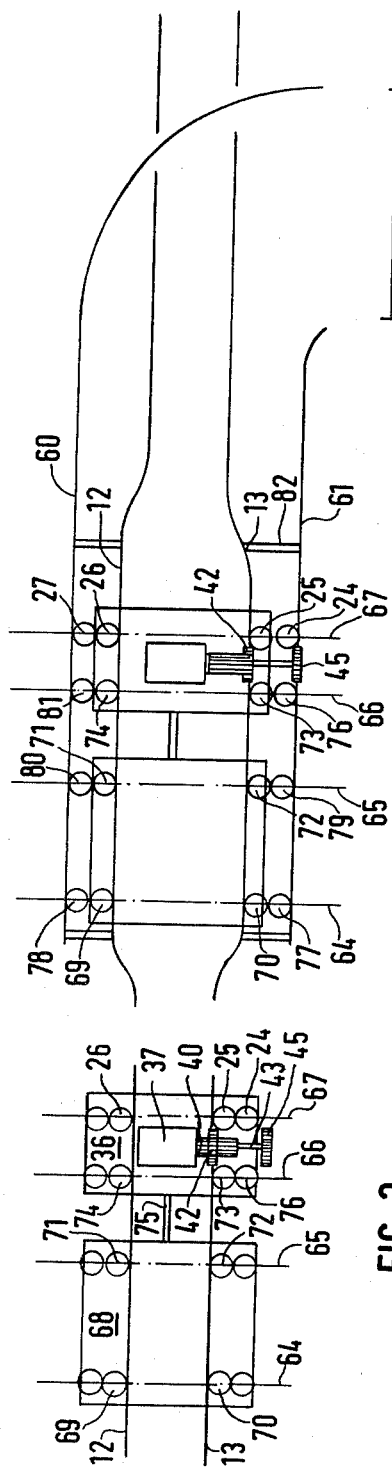
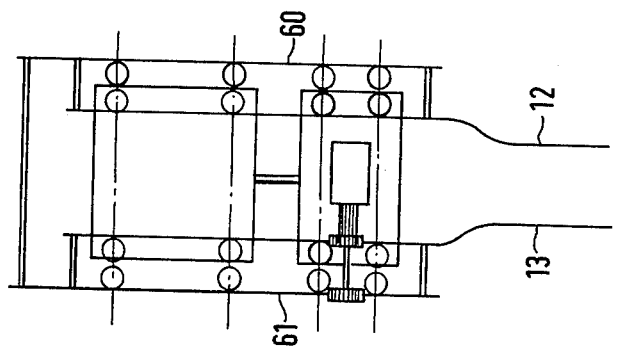
FIG. 4
FIG. 5
FIG. 3

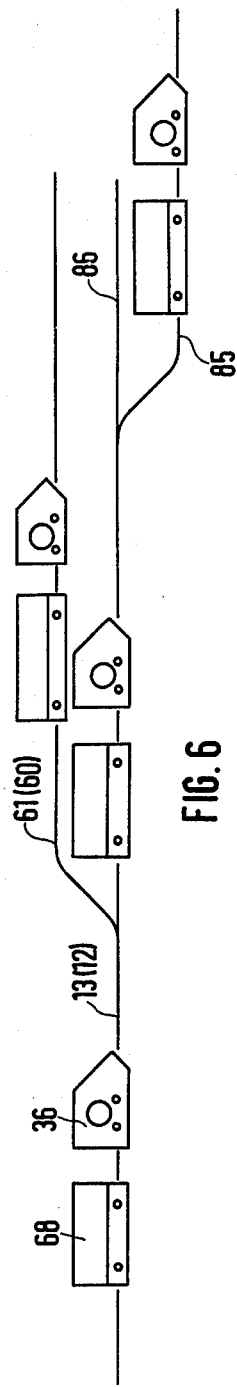
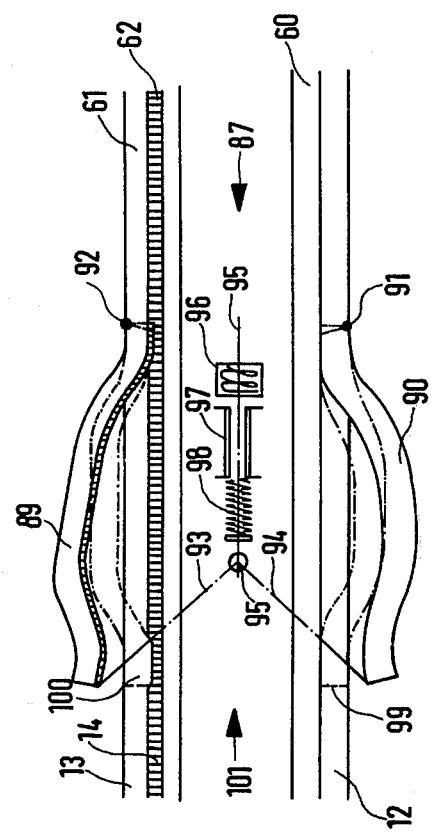
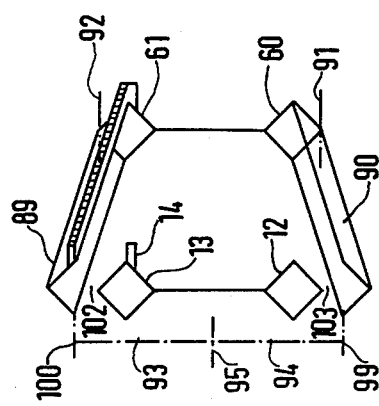

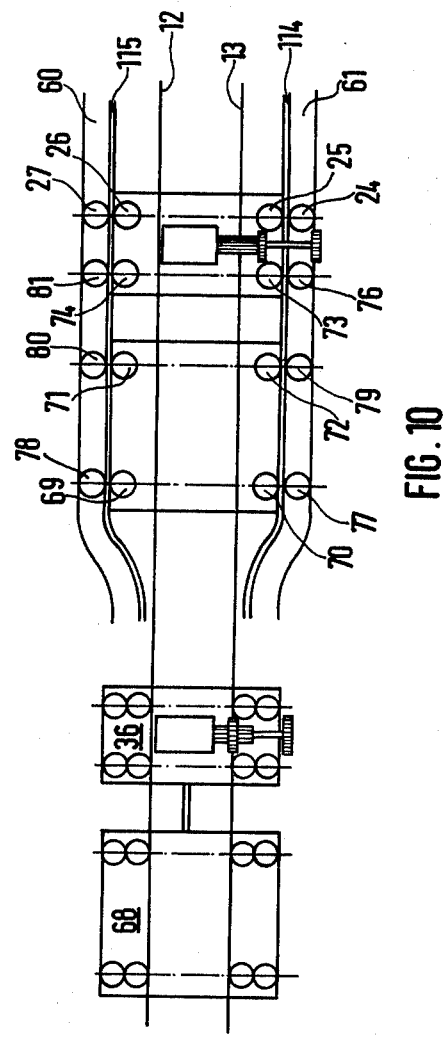
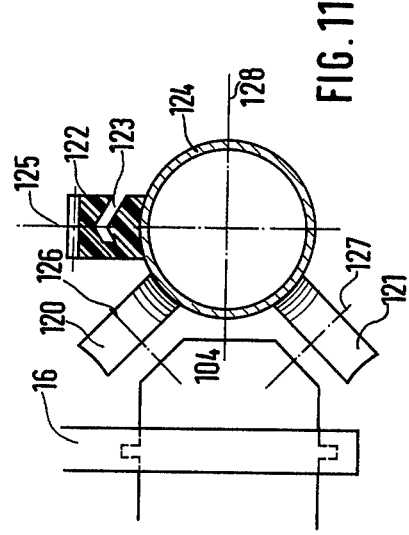

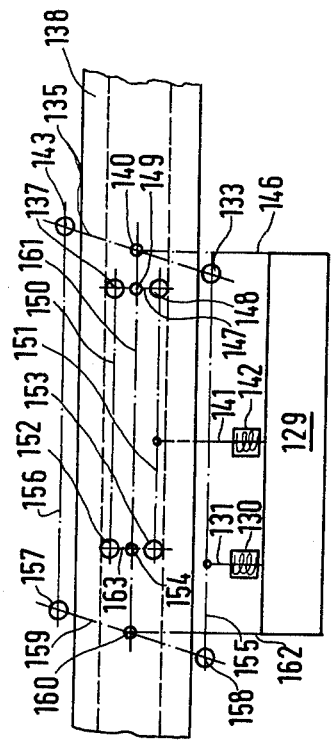
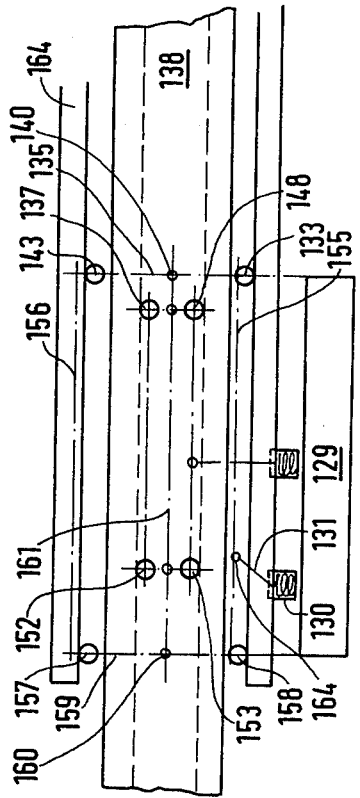
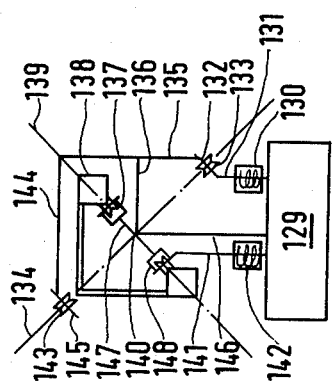
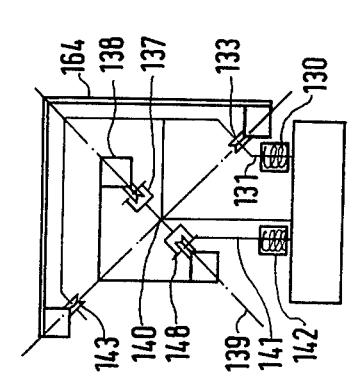

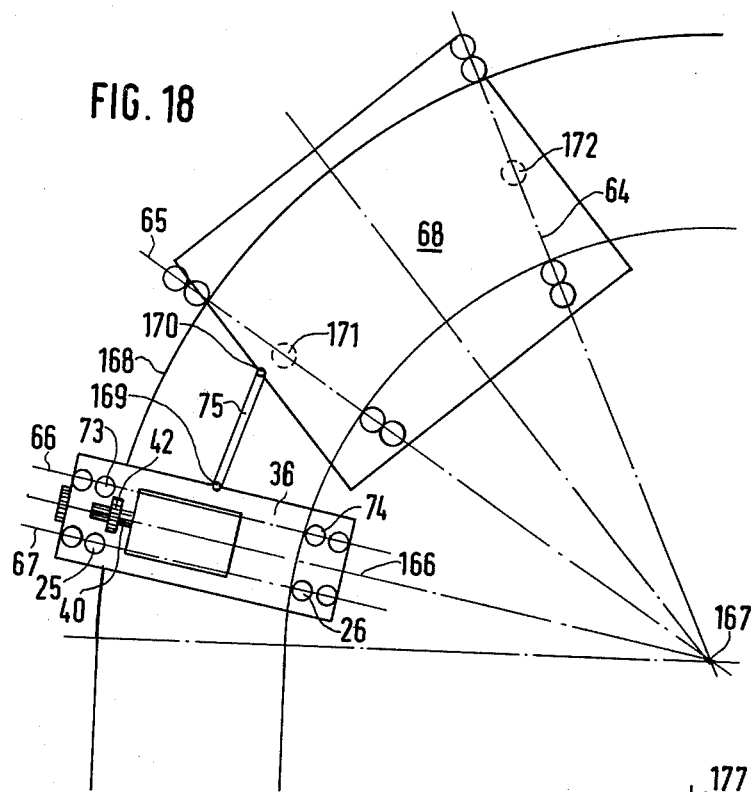
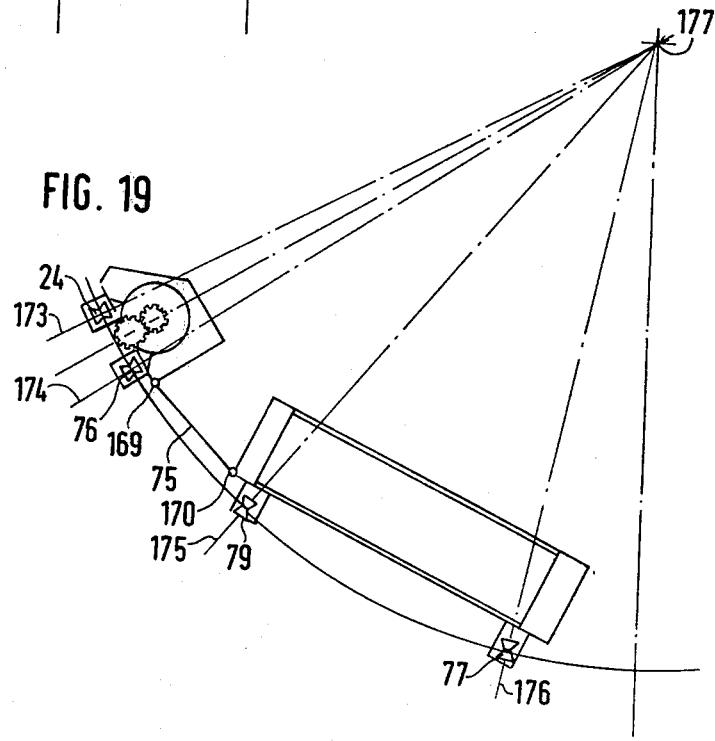

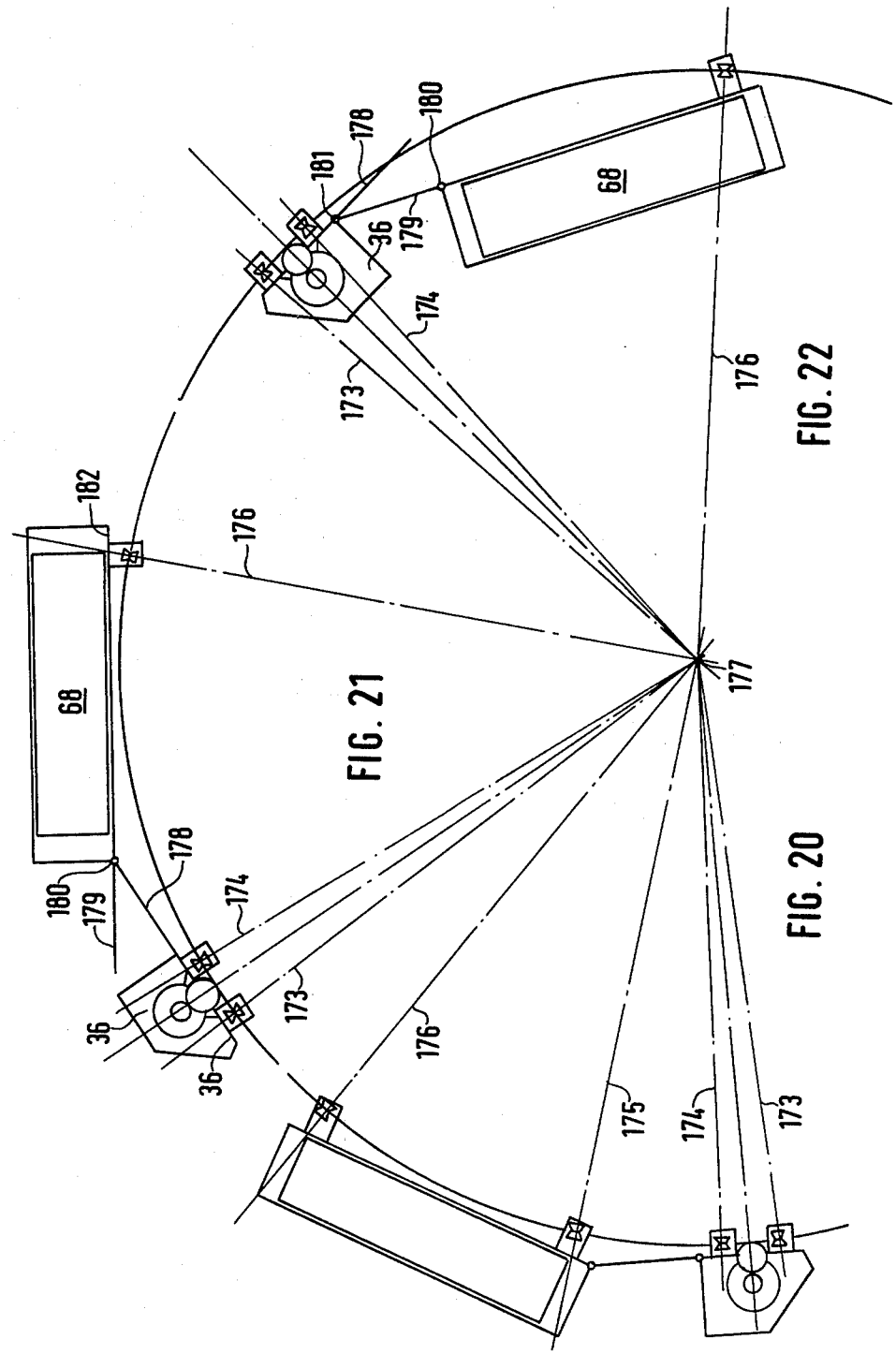

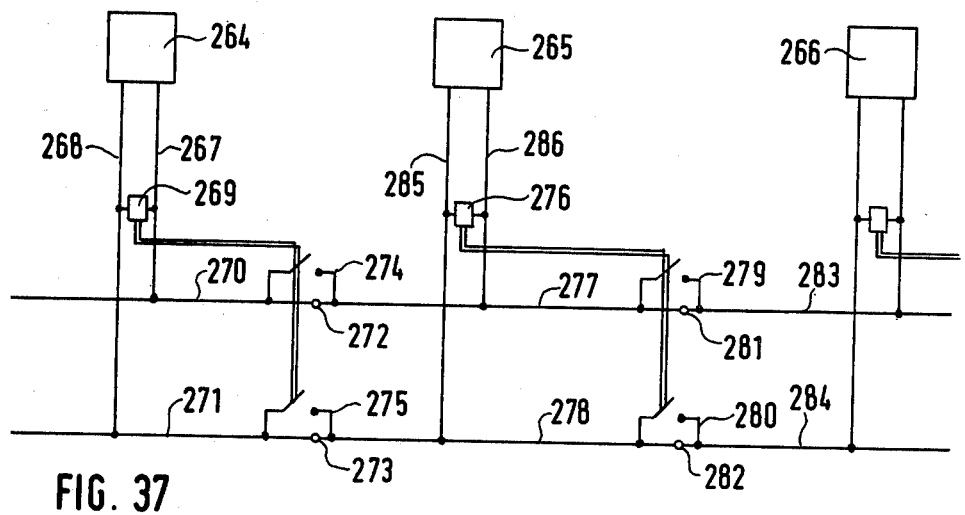
FIG. 37
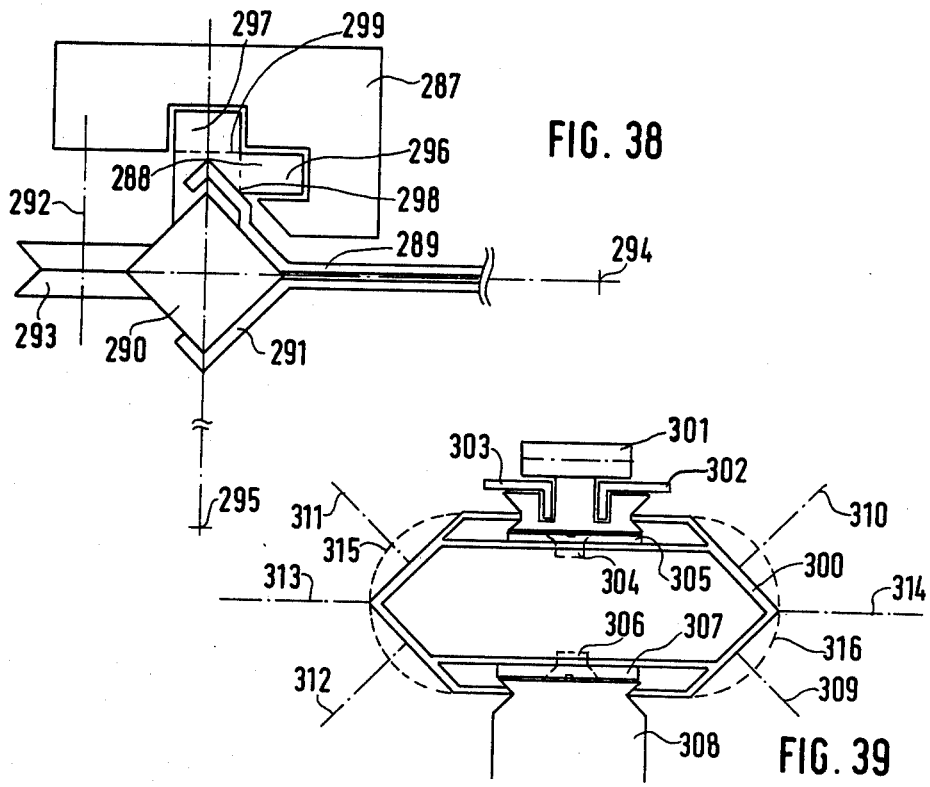
FIG. 38
FIG. 39

CONTROLLABLE DISTRIBUTING CONVEYING SYSTEMS

BACKGROUND OF THE INVENTION

The present invention relates to a controllable distributing conveying system which is used for transporting people and goods of any kind inside and outside buildings. The controllable distributing conveying system according to the invention is of the kind comprising a rail network made up of continuous horizontal and vertical guide rails along which self-propelled conveying units travel. On these conveying units or conveying tractors are transported containers which are used to hold people or goods, the containers being loaded on and off-loaded automatically at stations by the conveying unit with no manual intervention and the stations being connected to the rail network and thus necessarily to one another. For this purpose branch lines may be needed, which may be referred to as passive elements and by which the conveying units are caused to change their direction of travel, a central control unit giving active orders to the conveying units for the purposes of switching-in and -out, stopping and starting and coupling and uncoupling containers, and receiving in return passive reports. Also, the location and status of conveying units and station requests for containers to be collected in the system may be reported and these converted in turn into orders and at the same time an inspection may be made of a stand-by point for conveying units into which all conveying units which have not been instructed to perform any conveying job are conducted and from which they can be called up. The control unit may also exert control over one or more container depots from which empty or waiting containers can be called up when stations require them and issue an order, or in which they can be collected.

It is known that distributing conveying systems are for example used to transport documents, mail, and materials in both a solid and liquid state inside and outside buildings and between them. Such conveying systems may also be used to transport people (using so called cabtrack personal rapid transit for example), luggage at airports, and the like. It is also possible for such systems to be designed for and installed retrospectively in existing buildings. With systems of this type a distinction must be made between continuous conveyor systems and individual conveyors, that is to say electrified rail systems. Each operating position is connected to the system and it consists of a receiving and despatching point which are connected together to form a station.

Since there is a certain rate of operation at each operating position, the individual receiving points have an irregular supply, and the rates of arrival and despatch differ from station to station. In the case of both systems, conveyor compartments or containers are used to hold the goods being conveyed and these have manually moveable destination-indicating devices or pre-imprinted perforated or magnetic cards. After the destination indicator has been set at the station the containers of the continuous conveyor are inserted into the transport conveyor slot. The transporting movement is imparted by a continuously running belt or chain. In contrast to electrified rail systems, the transporting capability of continuous conveyors must be designed as to allow their belts or chains to withstand a sudden maximum load, namely the load generated by transporting all the containers, each carrying a maximum load, if they are fed into the system, which means making the motors driving the belts or chains excessively powerful. In addition, the belts have to be tensioned to different degrees to suit the load and climatic conditions. Because the belts and chains run continuously, there is greater wear on the deflector bearing rollers and belts, which thus require continual maintenance and may also produce additional noise.

In electrified rail systems, the containers have an additional aid in the form of an electric motor and drive units permanently connected to them. In newer designs, these drive units can be coupled and uncoupled manually as desired (e.g. the same drive can be used with containers of different sizes). The direct coupling of the transporting container to its undercarriage has the disadvantage that a supply of transporting units has to be held at the stations. This results in conveying units accumulating at various stations while other stations are short of conveying units. Procuring the conveying units which are lacking means an unnecessary load on the system as a result of units travelling empty, e.g. a current overload in certain sections of the track (a load beyond the capacity of the power supplies for those sections). The conveying unit is only used for actual transporting tasks for about 60 percent of the time and thus calls for a higher percentage of maintenance before giving an output equivalent to 100 percent employment on transporting tasks. The fetching of a conveying unit means an unnecessary wait for the operating personel, who cannot load the goods to be conveyed until the empty conveying unit has arrived, and who have to set the station indicator by hand.

The amount of space taken up by a station track is dependent on its capacity for conveying units. If the station track is short, all the incoming conveying units must immediately be sent out again, since otherwise the station will report that it is "occupied". A conveying unit intended for this station may not and cannot be switched out and therefore cruises round the system until the station spur has been cleared. The conveying units may have their power sources (batteries) or the drive units may be fed via current-carrying rails, as desired. These current-carrying rails are then part of the conveyor rails. In both cases, whether the trolleys have internal or external current sources, power supplies are needed. In the case of a current-carrying track where the supply source is not carried on board, a power supply feeds a stretch of track of given length. This length is dependent on the maximum output capacity of the individual power supply and on the number of consumers (conveying units) which may be travelling on this length of track. In the case of conveying units having on-board power sources, the units must be charged up again at specified points. Since the lengths of the sections of current carrying track are dependent on the maximum possible consumption by conveying units situated in them (which is particularly critical in ascending stretches), a large number of individual power supplies are required. When a maximum number of conveying units accumulate in a section, the power supply concerned is subject to a maximum load while other supplies are free of load to some extent. This means that the optimum use is not made of the overall capacity of all the supplies in the system. Since the current-carrying rails are very small in size, no assistance can be gained by having a single power supply to meet the total consumption of all the conveying units.

In the case of both continuous conveyors and rails conveyors, active switching points are needed for switching out purposes and these include moving parts and are given regular maintenance or if repairs are necessary have to be repaired on the spot, the locations concerned often being difficult of access since to save space the systems installed, as far far as possible, in suspended ceilings or shafts. Repairs means that one stretch or the whole of the system has to be shut down.

It is an object of the invention to provide a distributing conveying system which performs all conveying tasks in the optimum fashion, which reduces waiting time for the operating personel to a minimum, and which has few mechanical parts which require intensive maintenance and involve complicated processes of manufacture. The intention is also to avoid blockages in certain sections of track and to make it possible for assembly to take place quickly and without difficulty without special tools or drilling operations being necessary.

SUMMARY OF THE INVENTION

This and other objects are achieved in accordance with the invention by a controllable distributing conveying system for transporting people and goods of any kind inside and outside buildings, comprising rails, stations and conveying units, which is characterised in that on a passive network of rails are arranged stations which may comprise container loading-on positions, container off-loading positions, container depots and the like, between which self-propelled controllable conveying units are able to move, the conveyor units being fitted with pairs of running wheels for normal travel and for switching-in and switching-out travel and their container carrying surface being separate from the drive section and being coupled on by a universal joint member, containers being loaded onto and off-loaded from the conveying units by means of loading and off-loading arrangements which have active locking members and unlocking members, the containers being held secure in all directions during travel, and also being conducted to their destination by the shortest path by means of passive switching-in arrangements and passive switching-out arrangements, which possibly do not employ switching points, the switching-in and switching-out arrangements comprising prefabricated rail members like the normal rails, which the conveying units hold onto.

The distributing conveying system according to the invention is also characterised in that the wheels of the conveying unit which are intended for the switching-in and switching-out travel hold onto the switching-in and switching-out rails on the inside during switching; the normal spacing of the rails is altered to the different spacing of the switching-out arrangement by curving the rails to this altered spacing, as a result of which the switching-in and switching-out wheels are forced to engage with the switching-in and switching-out rails, which run parallel to the main rails; a gear wheel on the axis of the running wheel arrangement engages with a rack secured to the rail; the altered spacing changes back to the normal spacing as a result of the rails following a curved-in path; holding magnets prevent the mountings for the running wheels from being slid back by springs relative to the carriage bottom plate which carries the drive motor, so that the conveying unit is held onto the inside of the switching-out rails by the running wheels intended for switching-in and switching-out travel, the gear wheel on the axis of the running wheel arrangement being driven over the rack secured to the rail by the electric motor, via its driving pinion and a gear wheel which is free running under these conditions, the drive pinion being arranged to be displaceable relative to the gear wheel mounted on the running wheel arrangement.

The distributing conveying system according to the invention makes it possible for conveying units in direct contact to travel in different respective directions without waiting for switching points to change back, and the pulses for switching-in and -out, stopping, starting, and loading containers on and off are controlled by a central control unit, the central unit receiving passive reports in return and converting them into control instructions which affect the conveying units. At the same time each conveying unit has a non-contacting electronic approach-control system and/or a distance measuring system and these prevent conveying units from making contact with conveying unit travelling in front of them or stationary conveying units by in each case measuring the distance from the conveying unit which is first in the direction of travel to the conveying unit following it in and by causing the following unit to conform to the speed or stationary state of the unit in front.

To ensure that the conveying units can also negotiate extremely tight curves and undulations, the drive is separated from the container-carrying platform and is connected by a universal joint member. This ensures that each drive wheel intersects the curve or undulation radially, as a result of which there is no need for a radially pivotable drive. The separation between the container-carrying surface and the coupled-on drive section means that the structure of the moving units is of extremely small height, i.e. the height of the upper edge of the structure from the lower edge of the rails is of an optimum minimum value for the fixed length of the structure. Two shafts may preferably be used for the container-carrying section, whose spacing is selected in such a way that when the arc of an undulation is being negotiated on the outside of the underside does not touch the outer periphery of the arc formed by the rails and when the arc of an undulation is being negotiated on the inside the outer edges of the carrying surface do not touch the inner periphery of the arc formed by the rails.

The separate drive section likewise has two shafts for its wheels and the spacing between these shafts is selected in such a way that the drive wheel, which is preferably a gear wheel, meshes with the rack on the conveyor rails between these two shafts. The changes in the distance from the gear wheel to the rack of the conveyor rail which occur on the inside and outside of arcuate undulations as compared with straight stretches of track, which represent an ideal case, can be ignored, since a coarse-module rack is used which allows for any play between the teeth. This is particularly the case when the rack bends in the arcuate undualtions, the tooth gaps then becoming narrower or wider as the case may be, so that the gear wheel necessarily meshes at a higher or lower level. The center line between the closely coupled shafts of the drive-section is also the center of the shaft of the driving gear wheel and thus lies radially to a curve in the track, which provides the advantage that a special form of rack does not have to be developed for the curves.

To ensure that the conveying units are accurately positioned at the various points for loading on and off-loading containers, use is made of a direct-drive motor having an electromagnetic brake. In the "go" state the brake is released and in the "stop" state or in the event of current failure it is actuated. This also prevents stationary conveying units from rolling back in ascending sections. This combination of a brake and a direct-drive motor also offers the advantage of the maximum utilization of torque and the maximum efficiency, as compared with worm-driven conveying units where the worm itself is intended to have a locking effect. The efficiency of such motors is however, less than 50 percent.

To allow the containers to be detached, there is provided on each conveying unit a holder or enclosure which fits round the container, when it is attached, like a cage and prevents it from slipping off. The container holding element is unlocked at a station by the conveying units themselves, the conveying units being able simultaneously to off load a container intended for the station in question and to load on another container, only a brief pulse being required since the locking mechanism engages automatically as a result of the nature and characteristics of the container.

The holder for the container on the conveying unit is so designed that even when the conveying units are not correctly positioned the container can still slide into the holder within certain limits and remains locked in place despite the fact that the holder is larger than the container itself.

Switching in and switching out both in the ascending or descending direction and in the straight-ahead direction is accomplished automatically by the conveying unit as a result of additional engagement with rails running in parallel with the main track which are prefabricated to follow a different path from the main track and are so shaped and arranged that they do not obstruct the main track. The result of this is that conveying units following close behind one another can be switched in or out without interruption in a continuous operation. The special arrangement of the switching-out rails coupled to the normal rails ensures that when being switched in and out conveying units do not relinquish the positive guidance provided for them by the in and out switches until they are engaged with the secondary track and have perfectly positive guidance from it. In normal travel, the running wheels grasp the conveyor rails in such a way as to receive firm and positive guidance from them. This is achieved by means of compression or tension springs or holding magnets. As mentioned at the beginning, this engagement must be released at the time of switching in and out, but only when a second pair of running wheels has taken hold on the rails for switching in and out and is positively guided by them. This prevents the moving unit from being able to leave the rails.

To allow conveying units which do not switch out to be detected, there is in each closed circuit of conveyor rail a compulsory switch which allows all conveying units requiring repair to travel straight on but which forces servicable conveyor units to change direction. The defective conveying units which travel straight on may be collected on a standby loop.

In order that conveying units which have not been entrusted with transporting tasks are not allowed to cruise continuously around the conveying system, depots for the conveying units are set up. If conveying units are not allotted a transporting task, they are switched off the main track onto the standby loop by the central unit and wait there until a transporting order is given, when they switch themselves back into the main track.

The contributing conveying system also has container depots in which are situated both empty containers and containers carrying a supply of stored material. The nature of the loading and unloading of the conveying units is the same as at the stations. When empty conveyors are needed at a station the appropriate instructions can be given automatically by the station or by the operating personel by indicating the requirement. At the same time, material stored in a container at a fixed storage location can be called up and conversely a storage container can be fed back to its location.

A particular advantage of the design of the running rails is that the current-carrying rails are also load-bearing members which are held together by ties and which also incorporate racks. In order to avoid a short circuit by the metal ties, which in this case hold two current carrying rails, the ties are insulated at one end from one current-carrying rail. Since the current-carrying rails are hollow members, they can be connected together in the longitudinal direction by means of clamping inserts. The clamping inserts are in two parts which are pressed against the inside faces of the hollow current-carrying rails by screws and are preferably oppositely tapered at both ends to prevent them from coming loose.

A further advantage lies in the manner in which cooperation is possible between the individual power supplies for individual sections of track, which are so laid out along the length of the track that when the supply capacity of one section is overloaded by an excessive number of conveying units, the power supplies which are not loaded can be connected in series and capacity can thus be doubled or multiplied as required. This operation may be controlled from a central or non-central position.

The advantages achieved with the invention lie particularly in the fact that instead of electromechanical switching points for switching in and out, what are used are rigid members involving no mechanical movement which permit continuous switching in and out without interrupting travel. As a result of the automatic loading on and off-loading of the containers by the conveying units the conveying units are not tied to the stations, do not have to wait for the operating personel, and after an off-loading operation can at once be entrusted with a new conveying task.

In comparison with the system of conveying units, with fixed containers, in the present case the same aim of optimization is achieved with the same number of cheap undriven mass-produced containers and a far smaller number of driven conveying units. The work of mechanical maintenance is restricted nearly wholly to the conveying units which perform the main active duties such as switching in and out and loading and off loading. In no case does a malfunction result in the conveyor track being blocked and it can soon be put right by exchanging conveying units.

BRIEF DESCRIPTION OF THE DRAWINGS

In order that the invention may be more clearly understood, reference will now be made to the accompanying drawings which show certain embodiments thereof purely by way of example, and in which:

FIGS. 3, 4 and 5 are schematic plan views of parts of a switching-out point showing how the conveying unit operates in each case.

FIG. 6 is a side-view of switching of points for switching out conveying units in an upwards or downwards direction, FIG. 7 is a plan view of another embodiment of switching points for switching in and out, FIG. 8 is a vertical section through the switching points shown in FIG. 7, FIG. 10 is a plan view of the process of switching a conveying unit in or out by means of guide plates, FIG. 11 shows an embodiment of guide wheels which act as a means of grasping the rails, FIG. 12 is a vertical section through another embodiment of guide track and of the means by which a conveying unit holds on to them, FIG. 13 is a side view of the guide track shown in FIG. 12, FIG. 14 shows another embodiment of the means for switching a conveying unit in and out, at the time when a decision between switching in and out is made, with the guide track shown in vertical section, FIG. 15 is a side-view of the means for switching in and out in the state shown in FIG. 14, FIG. 18 is a plan view of a conveying unit negotiating a curve, FIG. 19 is a side view of conveying unit negotiating the inside of an arc formed by an undulation, FIG. 20 is a side view of a conveying unit negotiating the outside of an arc, FIG. 21 is a side view of a conveying unit with a trailer coupling and a rearwardly located universal pivot point negotiating the outside of an arc, FIG. 22 is a side view of a conveying unit with a trailer coupling and a forwardly located universal pivot point negotiating the inside of an arc.

FIG. 37 is a schematic view of the means of connecting the various power-supply sections together in series, FIG. 38 is a sectional view of part of a drive member in the form of a linear motor with a guide rail and running wheel, FIG. 39 shows a further embodiment of guide rail with a rack and a support.

DETAILED DESCRIPTION OF THE PREFERRED EMBODIMENTS

Figure 1:
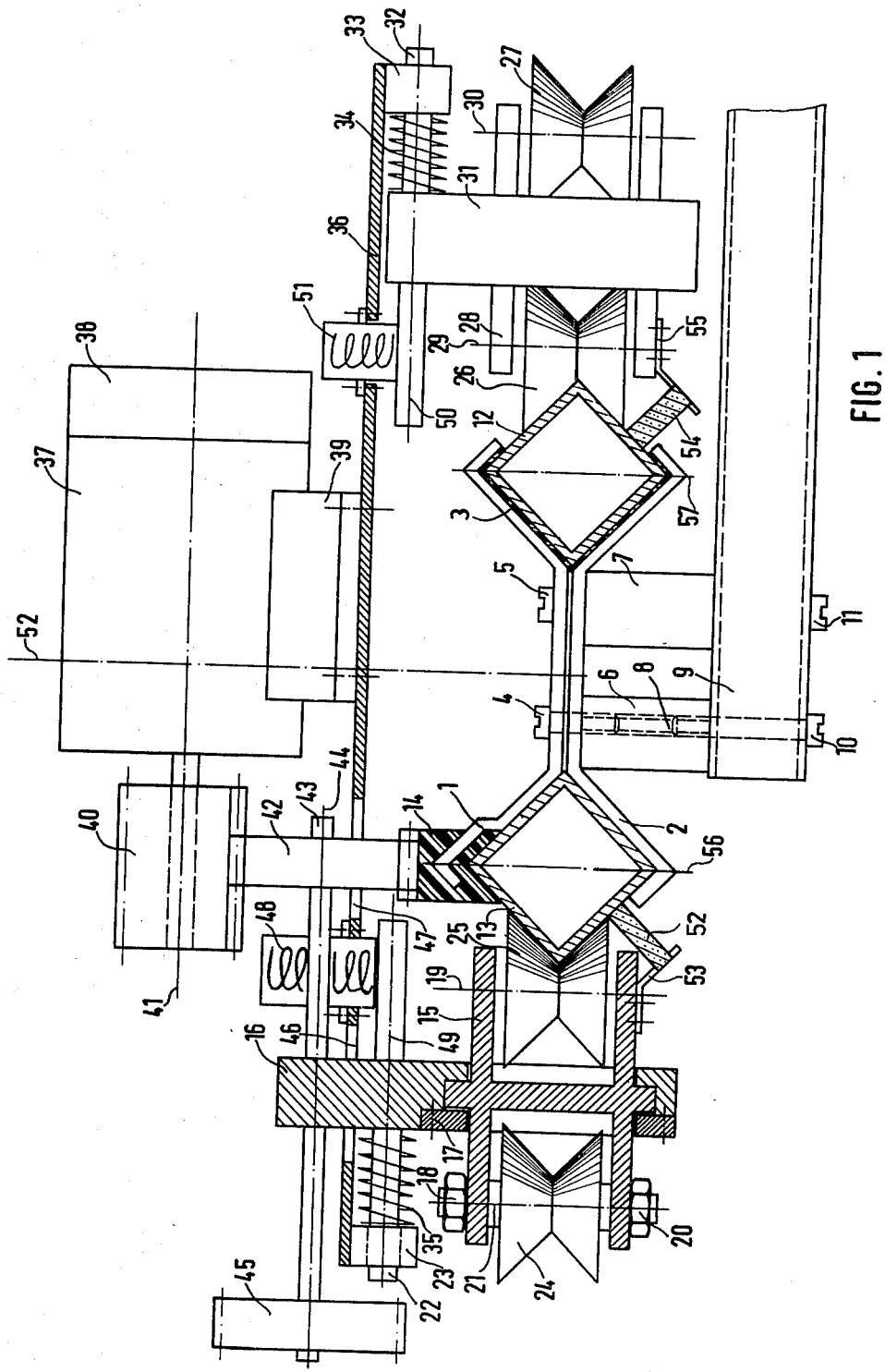
FIG. 1 is a vertical section through the drive section of a conveying unit.

Referring now to the drawings, FIG. 1 is a vertical section through the drive section of a conveying unit. Such a conveying unit is used to transport materials in containers on a system of rails. The rails 12 and 13 are both current-carrying members and running tracks for wheels 25 and 26. To hold the rails together, ties consisting of upper parts 1 and lower parts 2 are fitted at set intervals. The upper parts 1 of the ties also grip a rack 14. The upper and lower parts of the ties are secured by screws 4 and 5 to pillars 6 and 7 which are threaded at 8. At the points where it is desired to attach the ties, the pillars 6 and 7 are secured to a ceiling, wall or floor-mounted support 9. Because the ties are preferably made of metal to provide a strong clamping action, they have to be insulated at one end from the current-carrying rail 12, the insulation 3 consisting of an insulating substance which is sprayed onto the tie-parts or of a thin sheet. The shafts 19 and 29 of the running wheels 25 and 26 are secured in mountings 15 and 28. These mountings are mounted to pivot in carrier parts 16 and 31. A loop-shaped retainer device 17 prevents them from coming loose. The shaft 21 of a running wheel or roller is locked by means of nuts 18 and 20. Secured to the carrier parts 16 and 31 are shafts 22 and 32 which pass through slide bearings 23 and 33. Compression springs 34 and 35 are so designed that the slide bearings 23 and 33 around the shafts 22 and 32 are always at the same distance from the two carrier parts 16 and 31, in particular when the spacing of the rails between the ties alters or the spacing between the rails is deliberately made to alter. The slide bearings 23 and 33 are connected to a bottom plate 36. On the bottom plate 36, an electric motor 37 having a flange-mounted electrical brake 38 is secured on a pedestal 39. The shaft 41 of the motor carries a pinion 40. This pinion meshes with a gear wheel 42 and the latter in turn engages with the rack 14. The shaft 43 of the gear wheel is secured to the carrier part 16 and at the end it has a second gear wheel 45. If the distance between the axes 56 and 57 of the rails alters, i.e. if it is made larger or smaller, the running wheels 26 and 25 move in unison via their carrier parts 16 and 31 and the gear wheels 42 and 45 secured to the ends of the shaft. The carrier part 16 is able to move in a cutout 46 and the gear wheel 42 in a cutout 47 in the bottom plate. The compression springs 34 and 35 ensure that the bottom plate 36 is centralized relative to the center axis 520. To convey current to the electric drive motor, current collectors 52 and 54 are mounted on the carrier parts 16 and 31 on insulated mountings 53 and 55 and press resiliently against the rails 12 and 13.

Figure 2:
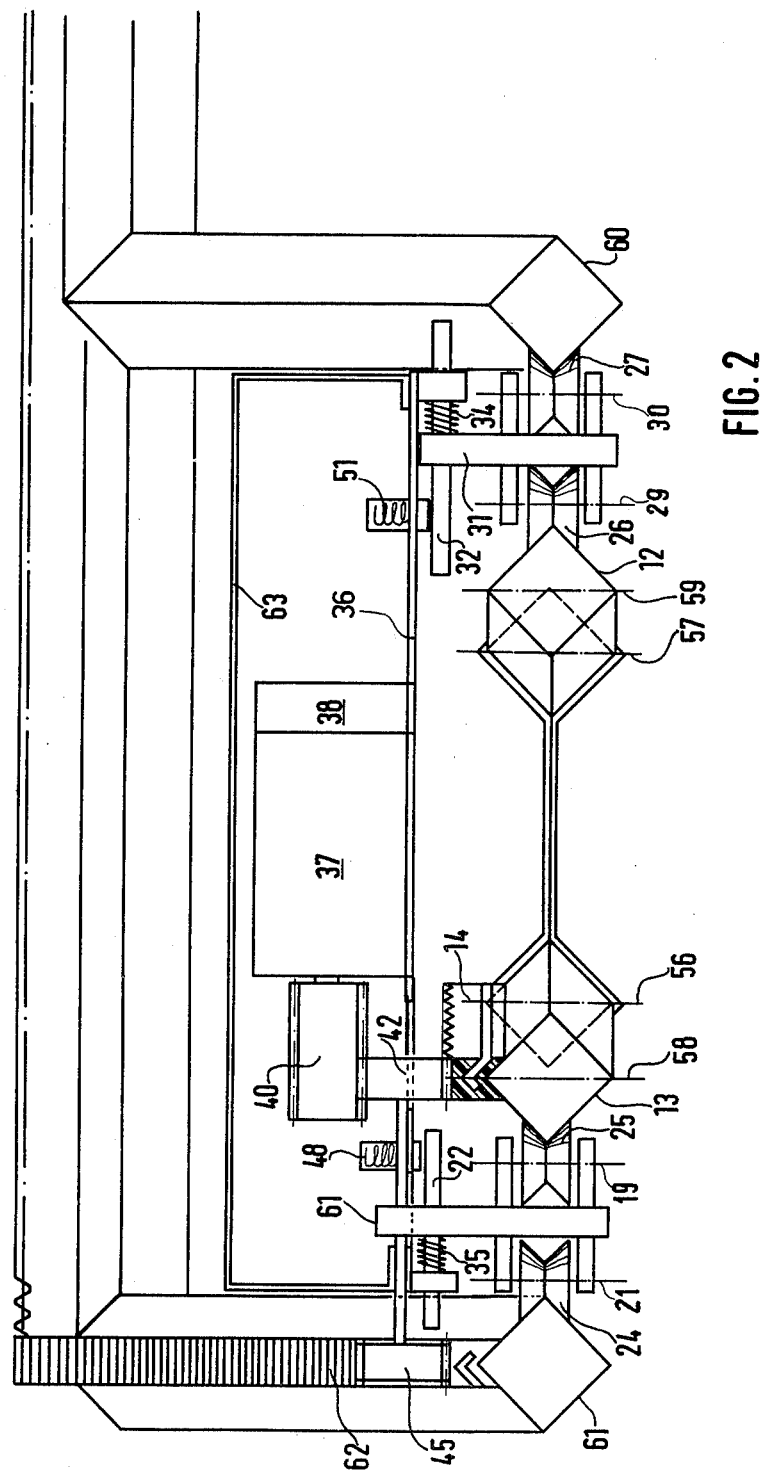
FIG. 2 is a vertical section through the drive section (also referred to as a carriage) of a conveying unit at the switching-in or-out position.

FIG. 2 is a vertical section through the drive section of a conveying unit at the time of a switching-in and-out operation. In this embodiment the running wheels 25 and 26 grip the rails 12 and 13 from the outside. The normal distance between the axes 56 and 57 is altered to the distance between axes 58 and 59 by curving the rails out to this distance between the axes 58 and 59. The running wheels 27 and 24 for switching in and out are forced into engagement with rails 60 and 61 for switching in and out which run parallel to the main rails 12 and 13. The gear wheel 45 on the shaft which carries gear wheel 42 engages with a rack 62. When the need for switching out or switching in is recognized holding electromagnets 48 and 51 receive a prolonged pulse to lock the shafts 22 and 32 in the case of switching out. The distance between axes 58 and 59 alters back to the distance between axes 56 and 57 as a result of the curved-in configuration of the rails. Gear wheel 42 disengages from rack 14 but continues to be driven at the end of the drive pinion 40. The holding magnets 48 and 51 are active from then on and prevent the carrier parts 16 and 31 from sliding back under the prompting of springs 34 and 35. The conveying unit grasps the inside of the rails 60 and 61 with its wheels 24 and 27 and is driven along by the gear wheel 45 on the rack 62 by means of the electric motor via its drive pinion 40 and the gear wheel 42, which runs free under these circumstances. The current collectors, which are not shown, receive their current from the current-carrying rails 60 and 61. The conveying unit begins to ascend the curved switching-out rails 60 and 61 and takes a different path. The ascent must continue till the upper edge of the top cover 63 of the unit can no longer collide with the lower edge of the rail 61 if this rail crosses the path of the rails 12 and 13. Once the switching out process has been completed, the rails 12 and 13 for normal travel, move back away from the rails 61 and 60, when the wheels 25 and 26 engage with the former again and the gear wheel 42 again engages with the rack 14. The holding electromagnets receive a releasing pulse. The shafts 22 and 32 are able to slide back again under pressure from the springs. The distance between the axes 58 and 59 changes back again as a result of the curved configuration of the rails to the normal distance between the axes 56 and 57. The wheels 24 and 27 then disengage from the switching in and out rails 61 and 60. Gear wheel 45 ceases to mesh with rack 62 and the conveying unit can continue its normal travel. The switching-in operation or entry into the normal path of travel from the switching-out rail takes place by a process which is the reverse of switching out.

FIG. 3 is a plan view of switching-out means of the kind illustrated in FIG. 2. Shafts 64 and 65 support a carrying surface 68 for containers. Shafts 66 and 67 support the bottom plate 36 carrying the motor 37. The conveyor rails 12 and 13 are gripped on the outside by wheels 69 and 70, 71 and 72, 73 and 74, and 25 and 26 in the respective cases. The drive pinion 42 drives the gear wheels 40 and 45, which are connected together by the shaft 43. The shaft 43 is connected to a carrier part (16 as shown in FIG. 1) which holds the mountings for the wheels 73, 76 and 24, 25. The running wheels thus form a solid unit with the gear wheels, gear wheel 42 being displacable along the drive pinion 40. A universal coupling between the drive section and the container-carrying surface which will be described in detail in what follows is formed by a part 75.

FIG. 4 is a plan view of the conveying unit on a curved-out section of the conveyor rails 12 and 13. The running wheels 69, 71, 74, 26, 25, 73, 72 and 70 have followed the movement of the rails, as also have gear wheels 42 and 45. The switching-out wheels 78, 80, 81, 27, 24, 76, 79 and 77 engage with the switching out rails 60 and 61 have been pressed forcibly outwards. The respective magnets for holding the shafts 64, 65, 66 and 67 (not shown in the present case) receive the switching-out pulse or holding pulse and on both sides prevent the wheel mountings on any of the shafts (not shown in the present case) from sliding back. The conveying unit, which is holding unto the switching out rails 60 and 61, follows a different path from that followed by the conveyor rails 12 and 13 and crosses over the latter. The conveyor rails 12 and 13 are moved back to their original positions. The rails 60 and 61 are connected to rails 12 and 13 by connecting members 82.

FIG. 5 is a plan view of condition at the time when the switching-out has been completed. The holding magnets (not seen) are released and the running wheels 69, 70, 71, 72, 73, 74, 25, 26 are forced back onto the main rails 12 and 13 again. The switching-out rails 60 and 61 come to an end. Switching-in takes place in the opposite direction, from FIG. 5 to FIG. 4. The holding magnets are then activated in FIG. 5 and released in FIG. 4.

FIG. 6 is a side view of different kinds of switching-in and switching-out involving upward and downward movement. The conveying unit, comprising a carrying surface 68 for containers and a trolley bottom plate 36 connected to it, moves along the main rails 12 and 13. In the case of switching-out in the upwards direction, the switching-out rails 60 and 61 travel upwards while the main rails 12 and 13 travel on without diversion under the switching-out rails in a different direction. In the case of switching-out in the downwards direction, the main rails 12 and 13 travel on without diversion downwards into a pair of rails 85. The switching-out takes place from the main rails 12 and 13 in a straight-ahead direction into a pair of switching-out rails 86.

FIG. 7 shows a modified embodiment of the system according to the invention, which employs switching-points at which an automatic forced switching-in takes place in the direction of movement 87 from the switching-out rails 60 and 61, which have a rack 62, onto the main rails 12 and 13. For this, pivotable sections of rail 89 and 90 belonging to the switching-out means, whose pivot points are 92 and 91, are so arranged that the pivoting blades 89 and 90 are secured by a linkage 93, 94 to a shaft 95 at whose end is situated a solenoid 96. The shaft 95 is guided by slide bearing 97. A compression spring 98 forces the pivoting blades away from one another in the unactivated state. A conveying unit which approaches from direction 87 and which is holding on to the switching-out rails 61 and 60, which carry the rack 62, on the outside, forces the blades together so that, in the pressed-in state, they press against the rails 12 and 13 for normal travel and the rack 14 at points 99 and 100. There is thus a forced change-over from the switching-out rails 61 and 60 and the switching-out rack 62 to normal travel on rails 12 and 13 and the rack 14 and this is forced to occur by the conveying unit itself. If a conveying unit approaching from direction 101 wishes to switch out, the solenoid receives a timed pulse and draws in shaft 95 in direction 101 in opposition to the pressure from the spring.

The switching-out blades 89 and 90 are pressed against the main rails 12 and 13 at points 100 and 99 and the conveying unit is switched out. When the switching-out has been completed, the holding-on pulse to the solenoid 96 stops and the pivoting blades are forced apart by pressure from the spring.

FIG. 8 is a vertical section through the switching-out means illustrated in FIG. 7. When travelling normally, the conveying units hold onto the rails 12 and 13 on the outside. If they are to continue to travel normally, they can pass without hindrance through the gap 102 between rails 13 and 89 and through the gap 103 between rails 12 and 90. If a conveying unit, coming from above along the rails 60 and 61 onto the pivoting blades 89 and 90 is to be switched in, then the blades are turned about their pivot points 91 and 92 by the forcible compression on them and press against the normal rails 12 and 13. The rods 93 and 94, which are attached by a pivot bearing at point 95 to the traction shaft, fold inwards and the axes 100 and 99 of the pivoting blades are forced inwards. Once the conveying unit leaves the pivoting blades, these are forced back to the normal position by spring pressure as shown in FIG. 7.

Figure 9:
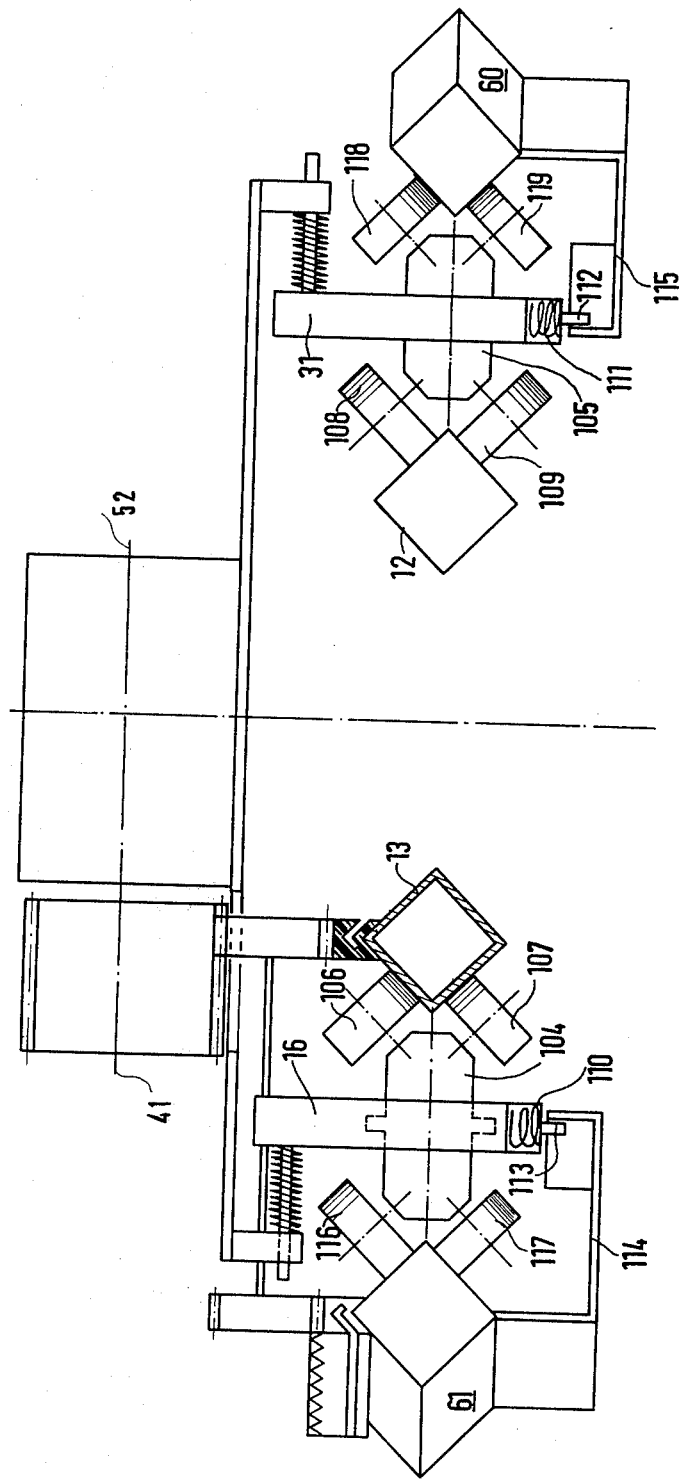
FIG. 9 is a vertical section through the drive section of the conveying unit while being switched in or out by guide plates.

FIG. 9 is a vertical section through the drive section of a conveying unit while it is being switched out by guide plates. The carrier parts 16 and 31 enclose the shafts 104 and 105 of the wheel mountings, and it is possible, as is illustrated in this case, for the running wheels 106, 107, 108 and 109 for example to lie perpendicular to the running faces of the rails. When a pulse is emitted for switching in or out, solenoids 110 and 111 are energized and extend respective spigots 112 and 113 downwards. These spigots engage with respective guide plates 115 and 114, which are connected to switching-out rails 60 and 61 respectively. The switching-out wheels 116, 117, 118 and 119 are forced against the switching-out rails 60 and 61 and, as the switching-out rails curve outwards, leave the main rails 12 and 13. The direction of travel on the switching-out rails may diverge from the normal direction of travel in a similar way to that shown in FIG. 2.

FIG. 10 is a plan view of an in and out switch and of a conveying unit having a carriage bottom plate 36 carrying a drive member and a carrying surface 68 for containers coupled to it. In the case of switching out, the solenoids shown in FIG. 9 (not shown in the present Figure) are energized and their spigots engage with the guide plates 115 and 114. The curvature of the switching-out rails 60 and 61 and the guide plates which are fixed to the rails pull the switching-out wheels 24 and 76, 79 and 77, 78 and 80, 81 and 27 against the switching-out rails. The running wheels 25 and 73, 72 and 70, 69 and 71, and 74 and 26 are forced away from the main rails 12 and 13.

FIG. 11 is a vertical section through an arrangement of running wheels 120 and 121 where the shafts 126 and 127 are secured to the wheel mounting 104 at an inclination of 90° to one another. The wheel mounting is mounted to pivot in the carrier part 16. The running faces of the wheels are curved to match the rail member 124. The horizontal axis 128 of the rail member is also the axis of the symmetrical wheel mounting 104 and the axes of the shafts 126 and 127 of the wheels are arranged at angles of 45° to axis 128. The bottom face of the rack 122 is matched to the rail member and a cut-out 123 in the rack allows it to be pressed against the rail by the ties.

FIG. 12 shows another embodiment of guide rail and a container section 129 which is suspended from a carrier 146. The latter is suspended to pivot at a point 140. Running wheels 143 and 133 are connected to point 140 via their shafts 145 and 132 and their carrier members 144, 135 and 136. The common axis of running the wheels 143 and 133 and their shafts 145 and 132 is rotatable at point 140 about an axis 139. The rotation may be effected by a solenoid 130 and its connecting linkage 131. Supporting running rollers or wheels 137 and 148 engage against the inside of the running rails 138 and are mounted with their common axis 139 to the rear of point 140. The axis 139 is arranged to be rotatable about axis 134, the rotation being effected by a solenoid 142 and its linkage 141.

FIG. 13 is a side view of the suspension of the container section 129 shown in FIG. 12. The outer running wheels 157, 143, 133 and 158 are connected by bearers 155, 159, 156 and 135 to form a parallelogram. The parallelogram of bearers is secured to a supporting shaft 161 at points 160 and 140, from which the container section 129 is also suspended by its carriers 162 and 146. A second parallelogram consisting of bearers 151, 147, 150 and 163 is also suspended from this carrier shaft, at the points 149 and 154 to which wheels 153, 148, 137 and 152 are secured and which in the present case support the container section since the wheels engage the rail 138.

FIG. 14 is a vertical section showing the outer running wheels 143 and 133 in the spread-apart condition, the wheels being operated by the solenoid 130 via its linkage 131, as a result of which they can be applied to the inside of the rail track.

FIG. 15 is a side view of the embodiment shown in FIG. 14. By means of its linkage 131 the solenoid 130 has locked a point 164 on side 155 of the parallelogram of bearers, which is able to move about points 160 and 140, in such a way that the outer running rollers or wheels 157, 143, 133, 158 can engage with a second rail track 164. The inner parallelogram of bearers and the inner running wheels 152, 137, 148 and 153 which it carries remains unaltered and grips the track 138.

Figure 16:
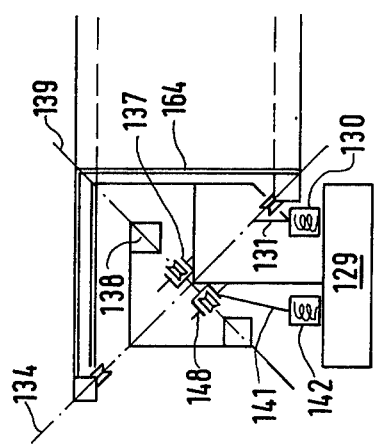
FIG. 16 shows a conveying unit at the completion of the switching-in and-out process with the guide track shown in vertical section.

FIG. 16 is a vertical section showing the inner pair of rollers 148 and 137, and their common axis 139, when they are disengaged, these rollers being turned about axis 134 by solenoid 142 and its linkage 151 and becoming free of the track 138. The track 164 begins to move in a different direction from track 138.

Figure 17:
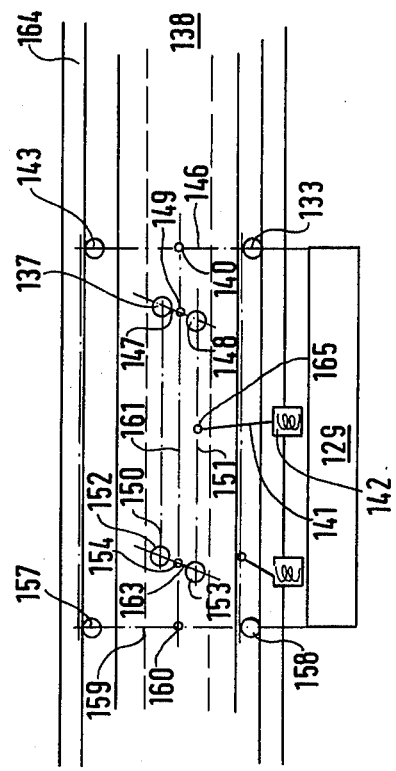
FIG. 17 is a side-view of the completed switching-in and-out process shown in FIG. 16.

FIG. 17 is a side-view of FIG. 16 showing the switching-in and-out operation when completed. By the holding solenoid 142 and its linkage 141, the disengaged inner rollers or wheels 152, 137, 148 and 153 have been turned, from point 165 on one side of the parallelogram, about points 154 and 149 on the carrier shaft 161 in such a way that the rollers disengage from track 138. In this way, the outer rollers 157, 143, 133 and 158, which are gripping the track 164, take over the function of supporting the container section 129, whose carriers 146 and 162 are connected to points 140 and 160 on the carrier shaft 161. The conveying unit now follows the direction of track 164. This process of changing over from one track to another takes place in a continuous flow. This means that no stoppage is necessary to switch the conveying unit in or out. The means for supporting the load from the containers always engage in the region of the carrier shaft 161 about which the various running rollers are pivotable and the switching in and out always takes place in one plane without crossing under or over a rail, which means that the container carrying surface is always in a horizontal plane before or after being switched out.

FIG. 18 is a plan view of a conveyer unit negotiating a curve. The carriage bottom plate 36 has a common center axis 166. On this center axis is situated the shaft of the pinion 40 of the driving motor, which engages with the gear wheel 42 lying beneath it. The gear wheel 42, carried by the running wheels 73, 74, 26 and 25 on axes 66 and 67, engages radially from the center of curvature 167 with the rack on the curved rail 168. The container section 68 is universally jointed at points 169 and 170 to the carriage bottom plate 36 by a coupling 75. This coupling may also consist of a spring, which has a natural universal action, or of an electromagnetic coupling in which case the drive section draws up to a container section and couples it on. Axes 64 and 65 are mounted to rotate at points 171 and 172 to allow the wheels to be aligned radially.

FIG. 19 is a side view of a conveyer unit on the inside of an arc. The running wheels situated behind the switching-out wheels 24, 76, 79 and 77 travel round the center of curvature 177 of the arc with the axes 173, 174, 175 and 176 of their mountings radially oriented. A universal connection is made at points 170 and 169.

FIG. 20 is a side view of a conveying unit negotiating an arc on the outside. The axes 173, 174, 175 and 176 of the mountings of the rollers or wheels are aligned with the center of curvature 177 and the wheels lying on them are therefore radially situated.

FIG. 21 is a side view of a conveying unit negotiating the outside of an arc. The axes 174, 173 and 176 of the mountings for the rollers or wheels are aligned with the center of curvature 177 which means that the running wheels are radially situated. The connection between the carriage bottom plate 36 and the container section 68 consists of links 178 and 179 and their common pivot point 180. Link 178 is co-planar with the carriage bottom plate 36. Link 179 is co-planar with the container bottom plate 182. As a result the axis 175 shown in FIG. 20 is no longer present.

FIG. 22 is a side view of a conveying unit negotiating an arc on the inside. The axes 173, 174 and 176 of the wheel mounting shafts lie radially to the center of curvature 177. The pivot point 181 for the common links 179 and 178 in this case is situated near the carriage bottom plate 36 due to the necessity for negotiating the arc on the inside, in contrast to the negotiation of the arc in FIG. 21 on the outside, where it is at point 180 on the container section 68. This is prevented by a automatic lock or shaft arrangement of the connecting links which is shown in detail in FIGS. 24 and 25.

Figure 23:
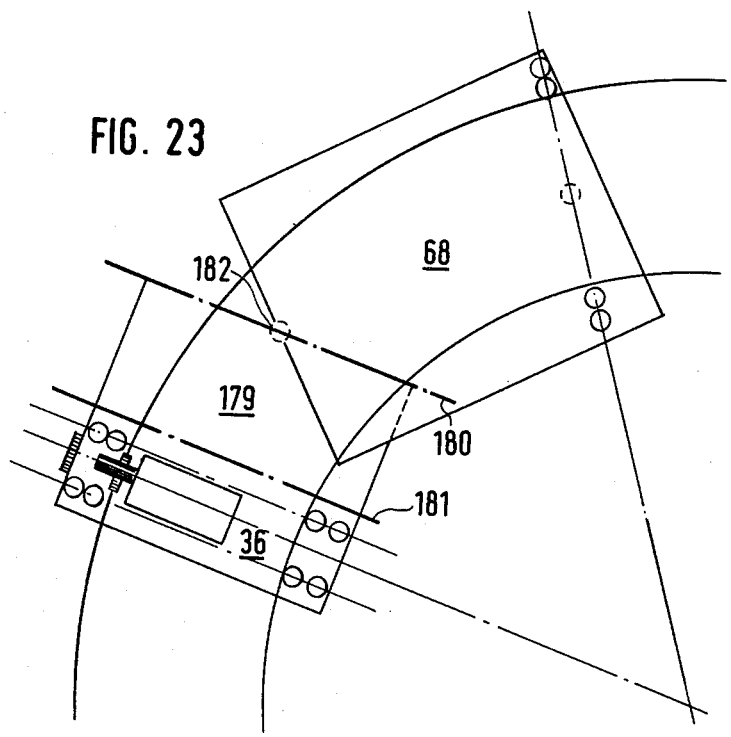
FIG. 23 is a plan view of a conveying unit with a trailer coupling negotiating a curve and a plan view of a universal pivot point.

FIG. 23 is a plan view of the connection between the carriage bottom plate 36 and the container section 68. A link 179 has a solidly connected pivot 182 to allow the container section to swing out radially. The axis 180 and 181 are respective reference axes for connecting links which can be pivoted as desired about the axis point.

Figure 24:
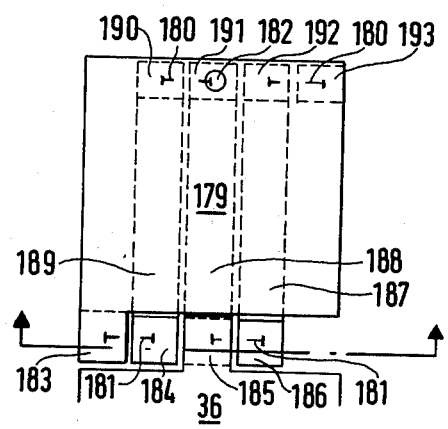
FIG. 24 is a plan view of a trailer coupling.

FIG. 24 is a plan view of a trailer coupling with a link connection from the carriage bottom plate 36 to the container section. The link 179 is in the form of a pivoting flap. Firmly connected to it are a shaft mounting 183 carrying an interrupted shaft 181 and a shaft mounting 193 carrying an interrupted shaft 180. Located on the link plate 179 is the pivot pin 182 for connection to the container section. A projection from the carriage bottom plate consists of a shaft mounting 185 solidly connected to the plate and an extension 188 (drawn in phantom) carrying a shaft mounting 191. A link 189 carrying shaft mounting 184 and 190 and a link 187 carrying shaft mountings 181 and 192 are locking members. If the link plate 179 is pivoted about its interrupted shafts 180 then, as it pivots, shaft mounting 190 on link 189 and shaft mounting 193 turn with it. The other shaft mountings 185, 186, 191 and 192 remain immobile. If the link plate 149 is pivoted about its interrupted shafts 181, then as it pivots only shaft mounting 183, and link 187 and shaft mounting 186 turn with it. The other shaft mountings 184, 185, 190, 191 remain immobile.

Figure 25:
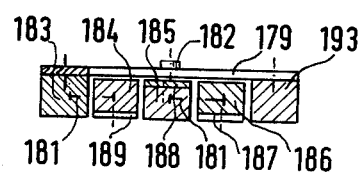
FIG. 25 is a vertical section through the trailer coupling shown in FIG. 24.

FIG. 25 is a vertical section through FIG. 24 looking in the direction of the arrows shown there. The pivot pin 182 for connecting on the container and the shaft mountings 183 and 193 are secured to the link plate 179. Link 188 represents the solidly connected extension to the bottom plate 36 of the carriage of the conveying unit, which has the shaft mounting 185 connected to it. Mounted on link 189 are the shaft mountings 184 and 190 (latter not visible), while on link 187 are mounted the shaft mountings 186 and 192 (latter not visible).

Figure 26:
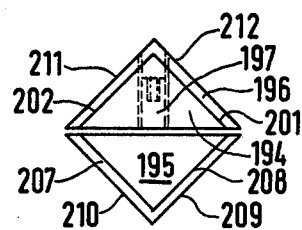
FIG. 26 is a vertical section through a clamping insert for connecting two rails.

FIG. 26 is a vertical section through a clamping insert, consisting of parts 194 and 195, which is inserted or plugged into and between two hollow rails. Such hollow rails may for example be members of square, rectangular, polygonal, round or oval cross-section. The outer edges 201, 202, 207, 208 for example match the inner faces of the hollow members. The outermost edges 209, 210, 212 match the outer faces of the hollow member. If two hollow members are inserted on the two ends of the clamping insert, a hexagonal-recessed socket screw 197 in a threaded hole in part 194 can be used to press part 195 against the inner faces of the hollow rail to forms a rigid, gapless clamped joint.

Figure 27:
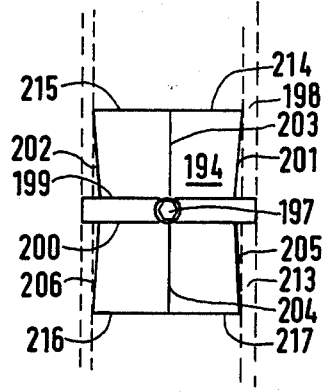
FIG. 27 is a plan view of the clamping insert shown in FIG. 26.

FIG. 27 is a plan view of the clamping insert shown in FIG. 26. The two insertable hollow members 198 and 213 (shown in broken lines) are inserted as far as edges 199 and 200. When the socket screw 197 is tightened the slightly tapered edges 201, 202, 203, 204, 205, 206 press against the inside faces of the hollow members. The side faces of the clamping insert are likewise tapered. This produces greater pressure per unit of area at edges 216, 217, 214 and 215 against the inside surface of the hollow members. The inside walls of the hollow members become cylindrical to one another and assume the shape of the clamping connector and are thus no longer able to be separated.

Figure 28:
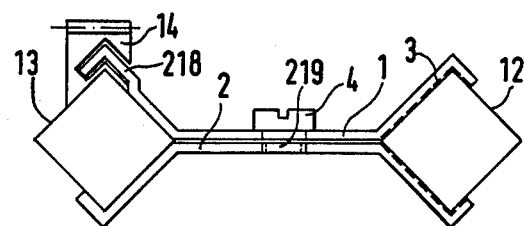
FIG. 28 is a vertical section through a tie to hold together two rails and a rack.

FIG. 28 is a vertical section through a tie together with current-carrying rails and a rack. The upper part 1 of the tie has a portion 218 which engages in the rack and which presses the rack 14 against the current-carrying rail 13. The lower part 2 of the tie has a threaded hole for the thread of a screw 4. By tightening the screw 4 the two parts of the tie can be connected firmly together and thus clamp up the current-carrying rails 12 and 13 and the rank 14, part of the pair of tie-parts being insulated from the current-carrying rail 12 at 3 to prevent the two rails being short circuited by the pair of metal tie-parts.

Figure 29:
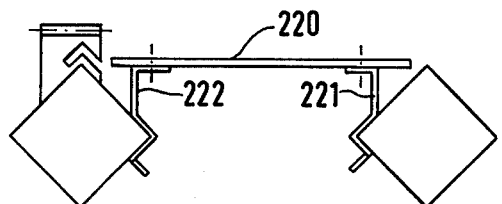
FIG. 29 is a vertical section through a cover mounted on two rails.

FIG. 29 shows a rail covering consisting of a sheet of plastics material and resilient mountings 221 and 222 secured to it. The sheet can be pressed onto the pair of rails from above or below and can also be removed again.

Figure 30:
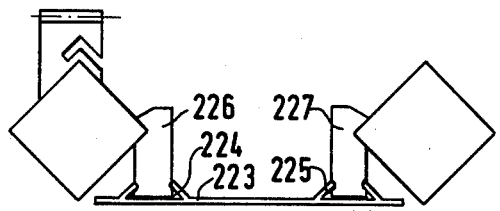
FIG. 30 is a vertical section through a cover having displaceable mountings fitted to two rails.

FIG. 30 shows a further embodiment of rail covering consisting of a plastics or metal sheet 223 containing channels 224 and 225 into which movable plastics mountings 226 and 227 can be inserted. The mountings can be pressed onto and detached from the pair of rails from above or below.

Figure 31:
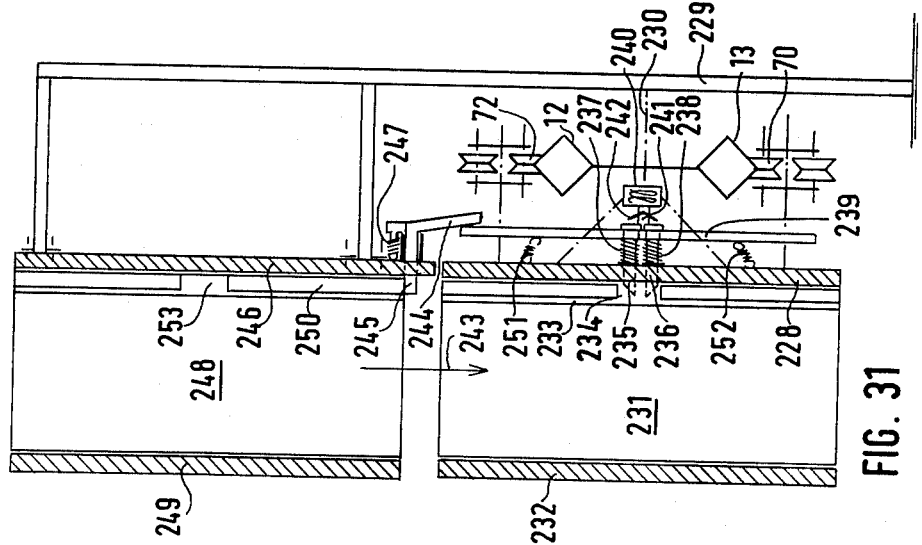
FIG. 31 is section through a station and a container and through a conveying unit and a container.

FIG. 31 is a vertical section through the container section of a conveying unit at a station. Running wheels 70 and 72, which are connected to a container-carrying plate 228, grasp the running rails 13 and 12 which are connected in turn to a support 229 on an axis 230. A container 231 is situated in an enclosure of which the container-carrying plate 228 forms a lower part and a plate 232 forms an upper part. The bottom plate 233 of the container has a projection 234 in which retainer pins 235 and 236 engage. These retainer pins project through the container-carrying plate 228 and are pressed by compression springs 237 and 238 against a bar 239. A holding solenoid 240 connected to the container-carrying plate has its plunger 241 secured to the linkage 239 and remains in the position shown when not energized. When the solenoid 240 is actuated, the plunger 241 slides in the direction of arrow 242 and the retainer pins 235 and 236 are drawn out through the container-carrying plate 228 in the direction of arrow 242 by the bar 239 and release the container 231, which can then drop downwards out of the enclosure in the direction indicated by arrow 243 under its own weight and can be caught in a receptable (not shown). The bar 239 engages with a station locking device 244. A traction spring 247 is connected to a plate 246 and to the locking device 244 and forces a pin 245, which is guided in plate 246, upwards and locks the container 248 at the station in place by a foot part 250 of the container which container is also held at the top by the holder 249. As a result of the solenoid 240 on the conveying unit being energized briefly both containers slide downwards. After the brief pulse to the solenoid, traction springs 251 and 252 pull the bar 239 back to its original position. As a result of a bevel which it has, the retainer pin 235 is forced back, in opposition to the pressure from spring 237, by a projection 235 from the container 248, which now slides onto the conveying unit to replace container 231 and strikes against retainer pin 236. Retainer pin 236 returns to its rest position. In this way the container is held in position in both directions by its projection 253.

Figure 32:
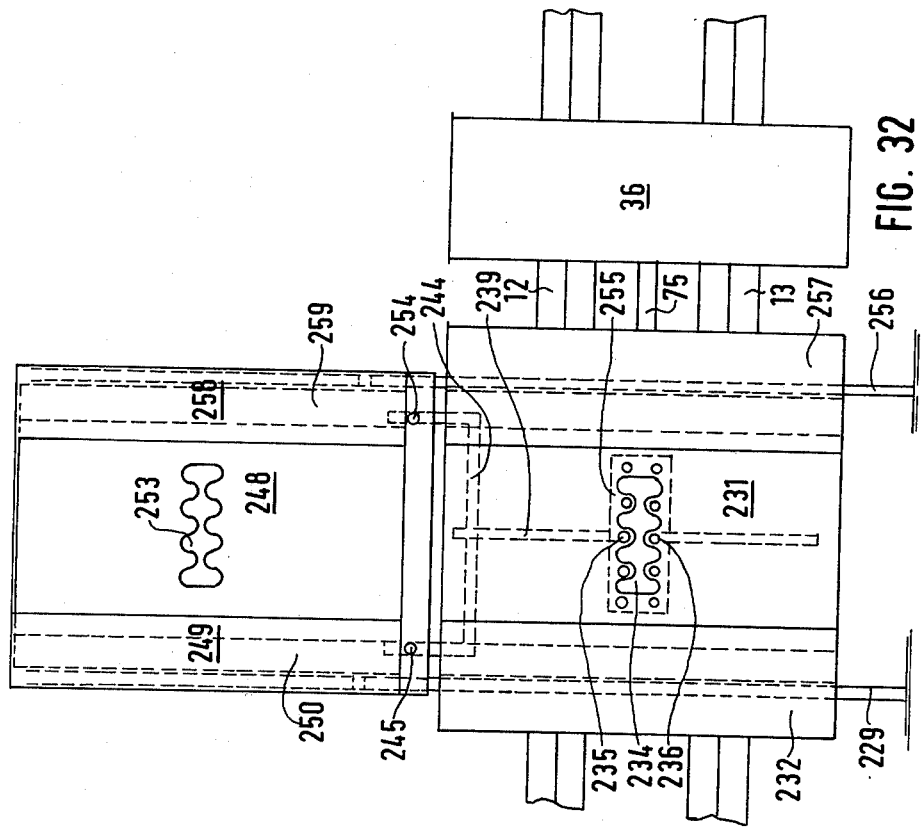
FIG. 32 is an elevation of the station, conveying unit and container shown in FIG. 31.

FIG. 32 is an elevation of the station shown in FIG. 31. The container 248 at the station is held at the station by enclosure parts 249 and 258. The locking pins 245 and 254, which are connected to a locking bar 244, prevent the container from sliding down by means of its foot parts 250 and 259 (shown in broken lines). The comb-like configuration of the container projections 234 and 234 makes it possible for the containers to be caught by the retainer pins 235 and 236 and similar adjoining pins (not given references) in a mounting 255 connected to the bar 239. The cage-like enclosure 232 and 257 is larger than the containers, and if a container moves into it from the station side and is not in the position shown in the drawings but is displaced sideways, the container must still be caught by the juxtaposed pins. This provision may be necessary if the drive section 36 and its coupling 75 to the container section do not stop exactly at the intended position. The rails 12 and 13 are held by supports 229 and 256.

Figure 33:
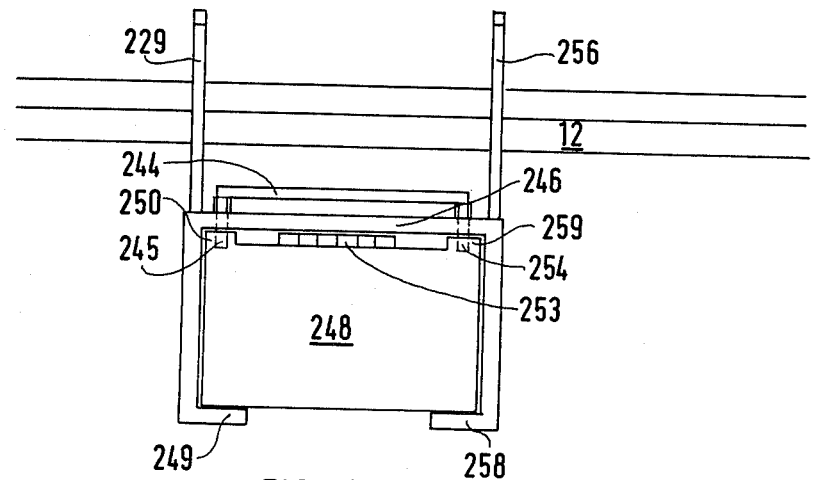
FIG. 33 is a plan view of the stationary container-holding device parallel to the conveyor rails.

FIG. 33 is a plan view of the container section at the station. The container 248 at the station is held in the cage like enclosure 246, 249 and 258 by means of its projection 253 and foot parts 250 and 259 by the retainer pins 245 and 254 which are connected to the bar 244.

The station platform 246 is held by the supports 229 and 256 to which are attached the rail 12 and below it the rail 13.

Figure 34:
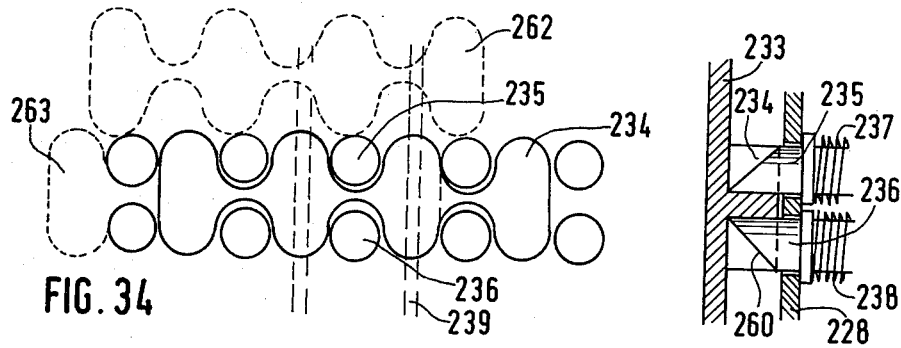
FIG. 34 is an elevation of the container-locking device illustrated in FIG. 33.

FIG. 34 is an elevation of the container projection 234 which is securely anchored between the retainer pins 235 and 236 and the bar 239 lying beneath them. If a container projection is displaced (262) when it arrives at the pins, it shifts its position (263) by one row of pins since the peripheries of the rounded surfaces which collide slide round one another.

Figure 35:
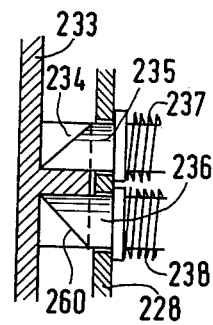
FIG. 35 is a side view of the container-locking device belonging to a conveying unit, which is shown in FIGS. 34 and 36.

FIG. 35 is a section through FIG. 34 as seen from the side. On the container bottom 233 is situated the fixed projection 234, which is held by the pins 236 and 235 to prevent it from slipping sideways. The pins are mounted to slide in the container-carrying plate 228.

Figure 36:
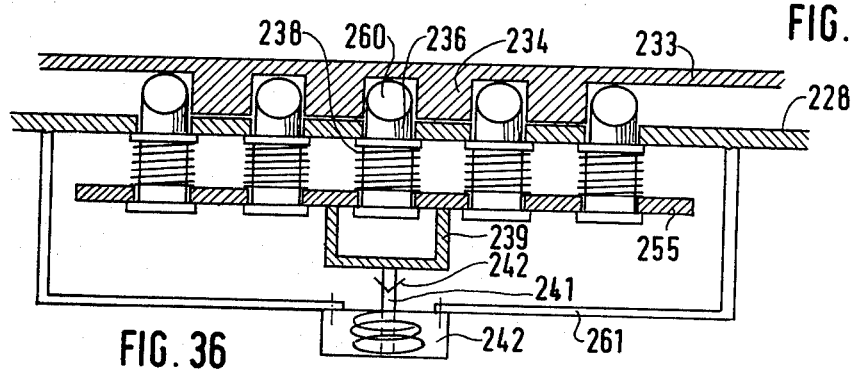
FIG. 36 is a cross section of the container-locking device on a conveying unit.

FIG. 36 is an enlarged section through a region of the container bottom plate showing the retainer pins 236 and compression springs 238 in the mounting 255. Each retainer pin can be depressed individually when the projection 234 fastened to the bottom 233 of the container strikes against its bevelled part 260. When a pulse is applied to the solenoid 240 and its plunger 241 is actuated in the direction of arrow 242, the retainer pins leave their position and release the projection 234 since the mounting 255 for the pins is connected to the bar 239 and the plunger 241 of the solenoid. The solenoid is connected to a mounting 261 and the container-carrying plate 228.

FIG. 37 is a diagrammatic view of a series-connected overload circuit. An input feed 264 feeds current-carrying rails 270 and 271 via input lines 268 and 267. Between these lines is a current overload indicator 269 which closes contacts 274 and 275 when the load on the current-carrying rails 270 and 271 is excessive. As a result, the insulators 272 and 273 which divide off the following individual current-carrying section 277 and 278 are bridged and a supply is provided by power supply 265 via its connections 285 and 286. The capacities of power supplies 264 and 265 are now joined to supply the individual sections 270, 271, 277 and 278 in common. If there is an overload on both sections a power supply 266 can be switched in in the same way.

FIG. 38 is a sectional view of part of a current-carrying running rail and shows a drive means 287 which represents a linear motor. The field of this motor encloses a member 288. This member, together with a current-carrying running rail 290, is held by a pair of tie-parts 289 and 291 at selected intervals. The linear motor is carried by a running wheel 293 attached to a shaft 292. When the linear motor travels round a horizontal curve around the center of curvature 294, the member 297 is removed as far as the broken line 299. When the linear motor passes through a vertically situated arc about the center point 295 the member 296 is removed as far as the broken line 298. This ensures that when travelling through the various curves the air gaps between the linear motor and member always remain the same.

FIG. 39 shows another embodiment of guide rail. The running rail 300 has a cut-out for a rack 301. The rack in turn has cut-outs for two current-carrying rails 303 and 302. A supporting member 308 has a cut-out by means of which it can be moved in the current-carrying or running rail. Two similar members may be connected to plates 307 and 305 by means of countersunk screws 304 and 306. The running wheels, which are represents by their respective axes, are able to engage with the rail member as wheels 309, 310, 311 and 312 or as two wheels at 313 and 314. The outer faces of the running rail may also be rounded (as shown by broken lines at 315 and 316), the running wheels then being rounded to match the outline of the running rail.

Figure 40:
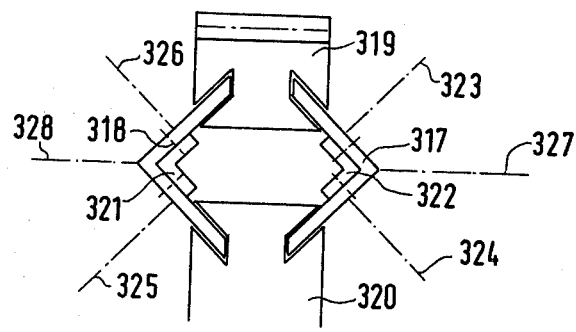
FIG. 40 shows another embodiment of guide rail with a rack and a support.

FIG. 40 shows another embodiment of guide rail. The separate current-carrying running rails 318 and 317 are connected by a rack 319 and supporting members as required. Both of these are insulated from the current-carrying running rails. Pairs of members can be connected together by angle brackets 321 and 322. A four-wheel arrangement is able to embrace the axes 323, 324, 325 and 326 and a twowheel arrangement the axes 237 and 238.

Figure 41:
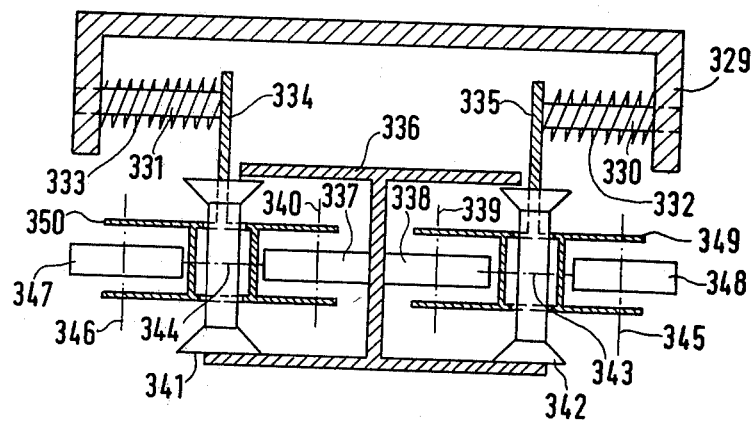
FIG. 41 is a section through another embodiment of running wheels guided in a channel rail.

FIG. 41 shows another embodiment of the running wheels 341 and 342 which are held in mountings 349 and 350 on axes 343 and 344 and the switching out wheels 337, 338, 347 and 348 on axes 345, 346, 339 and 340. The mountings are tensioned towards one another via bridges 334 and 335 and slide shafts 330 and 331 in an enclosure 329 by means of compression springs 332 and 333 so that the switching out wheels are at all times pressed against a channel 336. The enclosure 329 can be used to receive loads to be conveyed.

I claim:

1. A controllable distributing conveying system for transporting people or goods of the kind comprising rails, stations and conveying units, wherein stations are arranged on a passive rail network having main rails and secondary rails, said stations including container loading-on positions, container off-loading positions, and container depots, between which stations self-propelled controllable conveying units are movable, said units being fitted with respective pairs of running wheels for normal travel on said main rails and for travel on said secondary rails when being switched in and out and also having container-carrying surfaces coupled to drive sections by universal joints, containers being loadable onto and off-loaded from said conveying units by means of loading and off-loading arrangements which have active locking members and unlocking members, said containers being held secure in all orientations of said conveying units during travel, and being conductable to their destination via the shortest path by means of passive switching-in arrangements and passive switching-out arrangements comprising said secondary rails, which said conveying units in all said orientations thereof securely hold onto;

wherein at the time of switching-out the running wheels of the conveying units, intended for switching-in and-out travel, become clamped to said secondary rails on the inside, the normal spacing of said main rails being altered to a different spacing by curving said main rails to this different spacing, as a result of which said switching-in or switching-out running wheels are forced to engage portions of said secondary rails running parallel to the main rails, the different spacing of said main rails being altered back to their normal spacing after holding magnets are energized to keep said switching-in or switching-out running wheels in engagement with said secondary rails; and wherein said running wheels for normal travel hold on to said main rails on the outside by spring pressure, said holding magnets being provided to prevent the switching-in or switching-out running wheels from sliding out of engagement with said secondary rails under the prompting of said spring pressure.

2. A controllable distributing conveying system for transporting people or goods of the kind comprising rails, stations and conveying units, wherein stations are arranged on a passive rail network having main rails and secondary rails, said stations including container loading-on positions, container off-loading positions, and container depots, between which stations self-propelled controllable conveying units are movable, said units being fitted with respective pairs of running wheels for normal travel on said main rails and for travel on said secondary rails when being switched in and out also having container-carrying surfaces coupled to drive sections by universal joints, containers being loadable onto and off-loaded from said conveying units by means of loading and off-loading arrangements which have active locking members and unlocking members, said containers being held secure in all orientations of said conveying units during travel, and being conductable to their destination via the shortest path by means of passive switching-in arrangements and passive switching-out arrangements comprising said secondary rails, which said conveying units in all said orientations thereof securely hold onto;

said system further comprising an arrangement for automatically loading and unloading a container-carrying plate on the conveying unit at a station with a container, said loading and unloading arrangement including a container bottom plate having a projection in which retainer pins are engageable, said retainer pins projecting through said container-carrying plate and being pressed against a bar by means of compression springs, and wherein the projection from the container bottom plate and the container projection on the station-carrying plate (on the station side) are of comb-like form, whereby said container can be caught by said retainer pins and said station container by pins in said station-carrying plate which are connected to said bar and are held in the region of the container foot-parts.

3. A conveying system according to claim 2, wherein said container-carrying plate is fitted in its central region with retainer pins and compression springs in a mounting, each said retainer pin being capable of being depressed when said container projections slide in and strike against a part of a retainer pin.

4. A conveying system according to claim 3, wherein projections of comb-like shape extending parallel to one another and parallel to the edge of the container are mounted on the bottom of said containers.

5. A conveying system according to claim 4, wherein rows of retainer pins are mounted on said container-carrying surface which are arranged relative to one another for fitting into said projections of comb-like shape from said containers and for enclosing them.

6. A controllable distributing conveying system for transporting people or goods of the kind comprising rails, stations and conveying units, wherein stations are arranged on a passive rail network having main rails and secondary rails, said stations including container loading-on positions, container off-loading positions, and container depots, between which stations self-propelled controllable conveying units are movable, said units being fitted with respective pairs of running wheels for normal travel on said main rails and for travel on said secondary rails when being switched in and out and also having container-carrying surfaces coupled to drive sections by universal joints, containers being loadable onto and off-loaded from said conveying units by means of loading and off-loading arrangements which have active locking members and unlocking members, said containers being held secure in all orientations of said conveying units during travel, and being conductable to their destination via the shortest path by means of passive switching-in arrangements and passive switching-out arrangements comprising said secondary rails, which said conveying units in all said orientations thereof securely hold onto; and wherein a conveying unit carrying a container and grasping the main rails is movable underneath a container at a station, the latter comprising supports and a station plate having an enclosure, and can be stopped to allow its own container to be off-loaded and to allow said container at the station to be loaded on, a solenoid on said conveying unit pulling locking pins through the container-carrying plate and at the same time withdrawing a locking device having further locking pins into the station plate on the station side, the containers being released and dropping under their own weight.

7. A controllable distributing conveying system for transporting people or goods of the kind comprising rails, stations and conveying units, wherein stations are arranged on a passive rail network having main rails and secondary rails, said stations including container loading-on positions, container off-loading positions, and container depots, between which stations self-propelled controllable conveying units are movable, said units being fitted with respective pairs of running wheels for normal travel on said main rails and for travel on said secondary rails when being switched in and out and also having container-carrying surfaces coupled to drive sections by universal joints, containers being loadable onto and off-loaded from said conveying units by means of loading and off-loading arrangements which have active locking members and unlocking members, said containers being held secure in all orientations of said conveying units during travel, and being conductable to their destination via the shortest path by means of passive switching-in arrangements and passive switching-out arrangements comprising said secondary rails, which said conveying units in all said orientations thereof securely hold onto;

wherein at the time of switching-out the running wheels of the conveying units, intended for switching-in and-out travel, become clamped to said secondary rails on the inside, the normal spacing of said main rails being altered to a different spacing by curving said main rails to this different spacing, as a result of which said switching-in or switching-out running wheels are forced to engage portions of said secondary rails running parallel to the main rails, the different spacing of said main rails being altered back to their normal spacing after holding magnets are energized to keep said switching-in or switching-out running wheels in engagement with said secondary rails; and wherein each conveying unit is driven by means comprising a drive motor mounted on said drive section, a pinion carried by the shaft of said motor, a first gear wheel fixedly spaced from a second gear wheel on a common rotatable shaft and in continuous meshing engagement with said pinion, a first rack on one of said main rails and a second rack on one of said secondary rails, said first gear meshing with said first rack and said second gear idling freely while said main rails have their normal spacing before a switching-out operation, said first and second gears meshing respectively with said first and second racks while said main rails have their different spacing, and said second gear meshing with said second rack and said first gear idling freely when said holding magnets are enegized and said different spacing of said main rails has been altered back to their normal spacing.

8. A conveying system according to claim 7, wherein said main and secondary rails are both current-carrying and running wheel rails, said main rails being held together by ties consisting of an upper part and a lower part, said upper part of a tie also grasping said first rack, and said upper part and said lower part being secured to pillars by means of screws and said ties being insulated from said current-carrying rails by means of insulation means consisting of an insulating substance sprayed onto part of said ties or of a thin insulating sheet.

* * * * *